United States Patent [19]

Basnett

[11] Patent Number: 4,783,897
[45] Date of Patent: Nov. 15, 1988

[54] PRESSURE CYLINDER FLANGE ATTACHMENT AND METHOD

[75] Inventor: Michael N. Basnett, Powys, Wales

[73] Assignee: Lucas Industries Public Limited Company, Birmingham, England

[21] Appl. No.: 121,051

[22] Filed: Nov. 16, 1987

[30] Foreign Application Priority Data

Nov. 20, 1986 [GB] United Kingdom ............... 8627751

[51] Int. Cl.[4] .................. F01B 29/00; B23P 15/00
[52] U.S. Cl. .................. 92/161; 29/156.4 R; 29/510; 29/516; 29/511; 92/164; 285/382; 403/274; 403/285
[58] Field of Search .......... 29/156.4 R, 510, 511, 29/156.4 WL, 516; 92/163, 164, 169.1, 161; 285/382; 60/533; 403/274, 285

[56] References Cited

U.S. PATENT DOCUMENTS

| 1,329,479 | 2/1920 | Savon | 29/516 X |
|---|---|---|---|
| 1,721,765 | 7/1929 | Berge | 29/516 UX |
| 2,233,471 | 3/1941 | Clements | 29/516 UX |
| 2,487,512 | 11/1949 | Berger | 29/510 |
| 2,957,734 | 10/1960 | McLeod | 29/516 UX |
| 2,987,049 | 6/1961 | McLeod | 92/163 X |
| 3,214,511 | 10/1965 | Franklin | 29/516 UX |
| 3,266,383 | 8/1966 | Cairns | 60/533 X |
| 3,642,311 | 2/1972 | Edgemond, Jr. | 29/516 X |
| 3,914,852 | 10/1975 | Fisher | 29/516 X |
| 4,484,670 | 11/1984 | Axthammer et al. | 29/516 X |

Primary Examiner—Charlie T. Moon
Attorney, Agent, or Firm—Holman & Stern

[57] ABSTRACT

A pressure cylinder assembly includes a cylinder and an outwardly projecting flange. The assembly is formed by inserting into the cylinder open end a body having a groove in its outer surface, so that the groove lies in opposition to a wall of the member, and deforming said wall into the groove to lock the body axially within the member. This deformation produces corresponding depressions in the outer surface of the member. A flanged collar is then placed around the member and deformed into the depressions to lock the collar axially and rotationally relative to the body with the flange of the collar projecting outwardly for mounting the assembly on a support.

11 Claims, 2 Drawing Sheets

PRESSURE CYLINDER FLANGE ATTACHMENT AND METHOD

This invention relates to a method of forming a pressure cylinder assembly which includes a cylinder and an outwardly projecting flange, and also to an assembly formed by carrying out the method, such assembly being useful, for example, as the pressure cylinder of a master or slave cylinder for incorporation in a vehicle hydraulic clutch or brake actuating system.

The invention is primarily useful in forming assemblies in which the cylinder is a relatively thin-walled metal tube. Difficulties are sometimes experienced with this kind of assembly when conventional methods are adopted for attaching the projecting flange to the cylinder.

In one such conventional method, the flange is provided with an aperture of slightly smaller diameter than the cylinder external dimension at the intended flange location and pressed axially onto the tube at that location. Such a pressing operation can engender a large radially inward force on the cylinder wall, with the attendant risk of unacceptable bore distortion requiring additional corrective machining or leading to scrapping of the assembly.

It has also been proposed to weld the flange in position on the cylinder, but the application of welding heat to the tube can also result in bore distortion.

An object of the present invention is to provide a method of forming a pressure cylinder assembly which includes a cylinder and an outwardly projecting flange, as well as an assembly formed by carrying out the method, in which the aforementioned difficulties are minimised or avoided.

According to the present invention, a method of forming a pressure cylinder assembly which includes a cylinder and an outwardly projecting flange comprises inserting into a tubular member a body having a depression in its outer surface such that said depression lies in opposition to the wall of the member, deforming said wall into the depression to lock the body at least axially within the member and to form a secondary depression in the outer surface of the member, placing a flanged collar around the member and deforming the collar into the secondary depression in such a manner as to lock the collar axially and rotationally relative to the body so that a flange of the collar may then serve to mount the assembly on a support.

Preferably, a plurality of circumferentially spaced secondary depressions are formed in the tubular member and the collar is deformed into at least some of these secondary depressions. It may also be convenient to form a plurality of circumferentially spaced depressions in the body to enable the latter to be effectively locked rotationally relative to the tube as well as axially.

The body is preferably itself formed with an outwardly projecting flange against which the collar is brought into engagement prior to forming said secondary depressions, in order to set the position of the flange longitudinally of the body.

The invention will now be described, by way of example, with reference to the accompanying drawings in which.

Figure 1:
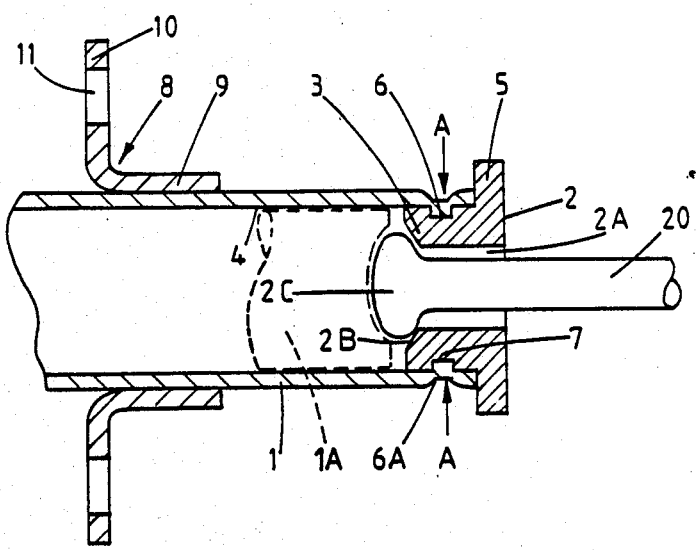
FIG. 1 illustrates one stage in the method of the invention for producing a pressure cylinder assembly.

FIG. 1 illustrates part of a pressure cylinder assembly, which includes a tubular member 1 forming the cylinder and which would, in use, contain a piston assembly, represented schematically at 1A, for pressurising, in conventional manner, fluid supplied to the cylinder from an external source, such as a fluid reservoir. The tubular member 1 is typically a drawn tube, usually of steel, having a substantially uniform wall thickness. Disposed within an open end of the cylinder 1 is an end member 2 having a cylindrical portion 3, which closely engages the internal cylinder wall 4, and a radially outwardly projecting flange 5.

The end member is provided with a primary recess in the form of a circumferential groove 6 and the first stages of the method of the invention are the insertion of the end member 2 into the cylinder open end to its position illustrated in FIG. 1 in which the flange 5 is in which co-operate with the groove to lock the end member 2 securely against axial displacement. This operation also forms a corresponding number of secondary recesses 6A in the outer surface of the cylinder for the purpose to be described. It would be possible to form the groove 6, as a number of part-circular portions separated by un-deformed material so that deforming the cylinder into such groove portions would also lock the end member rotationally relative to the tube 1. Additionally, or alternatively, the end member may be restrained against rotation by glueing or bonding to the internal surface of the tube 1.

A through bore 2A of the end member permits the passage therethrough of a force input rod 20 for actuating the piston assembly. A conical seat 2B is engaged by an enlarged head 2C of the rod when the latter is retracted and the end member thus forms a convenient and robust back stop for the retracted rod.

Figure 2:
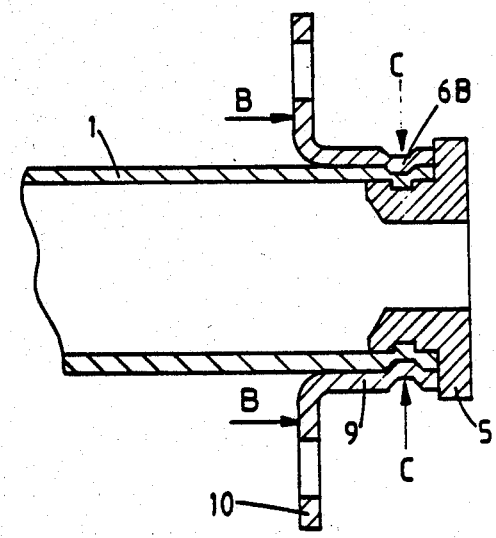
FIG. 2 illustrates a final stage in the method of the invention.

A third component of the eventual assembly is provided in the form of a flange member, indicated generally at 8, which has a cylindrical collar 9 having an internal diameter corresponding to the external diameter of the tube 1 and a radially outwardly projecting flange 10, the flange being provided with through holes 11 for the passage of securing bolts or the like. The next stage in the method consists in placing the collar 9 of the flange member in surrounding relationship with the tube 1 and moving the flange member along the tube to the position illustrated in FIG. 2 in which the forward end of the collar 9 is urged, by any convenient means, into engagement with the flange 5 of the end member 2, as indicated by the arrows B. The part of the collar overlying the secondary recesses 6A is then inwardly deformed, by a further lancing operation for example, represented by the arrows C in FIG. 2, to force corresponding parts 6B of the collar into those recesses and thereby lock the flange member both axially and rotationally relative to the tube 1. It would again be possible, for additional security, to place a glueing or bonding agent between the opposed surfaces of the collar 9 and cylinder 1.

Figure 3:
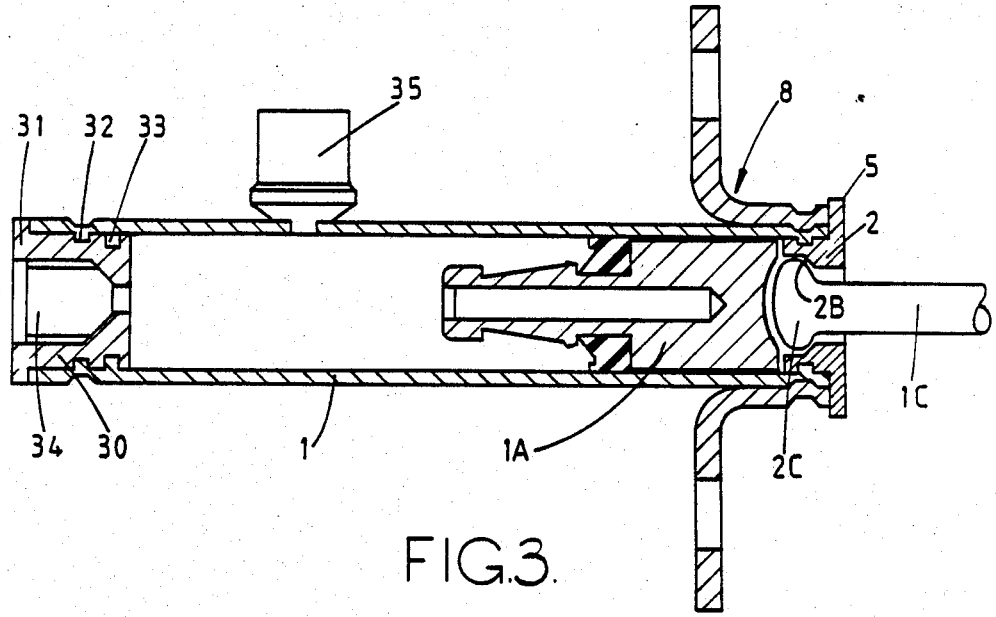
FIG. 3 is a longtudinal cross-section of one form of pressure cylinder assembly made by the method of the invention.

The master cylinder illustrated in FIG. 3 is one form of assembly produced by the method of the invention. The assembly includes a pressure cylinder 1 in which is slidable a piston assembly 1A of and convenient conventional design actuated by a force input rod 1C. A flange member 8 is secured to the outer surface of the cylinder 1 in the manner described above, using a recessed end member 2 which is previously secured within an open end of the cylinder. A radial flange 5 of the end member sets the position of the flange member 8 during assembly and a bevelled or conical internal surface 2B of the end member is engaged by an enlarged head 2C of the rod 1C, as previously.

In this embodiment, the cylinder 1 is a drawn steel tube which is initially open at both ends. The end of the tube remote from the flange assembly 8 is closed by a further end member 30 similar to member 2 but having a smaller radial flange 31 which abuts against the end of the cylinder. The member 30 is secured in position by deformation of the cylinder into one or more grooves 32, or groove portions, as before. A seal 33 prevents leakage of fluid past the member 30. In inlet port 34 of the latter would normally be connected, in use, to a fluid reservoir and controlled, in the present arrangement, by a centre valve (not shown) actuated by the piston 1A in conventional manner. A fluid outlet port 35 would normally be connected, in use, to a vehicle braking circuit. of the latter would normally be connected, in use, to a fluid reservoir and controlled, in the present arrangement, by a centre valve (not shown) actuated by the piston 1A in conventional manner. A fluid outlet port 35 would normally be connected, in use, to a vehicle braking circuit.

Figure 4:
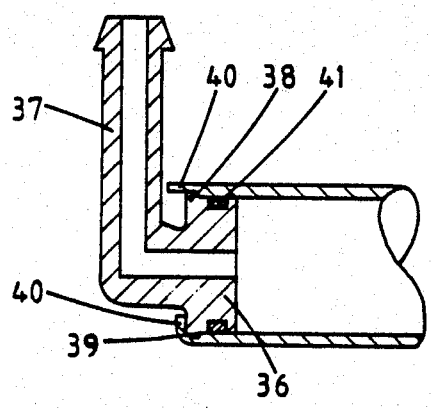
FIG. 4 is a scrap sectional view of part of an alternative form of master cylinder of the invention.

FIG. 4 illustrates a possible modification in which an alternative form of end member 36 provides an integral fluid outlet pipe 37. The member 36 has a shoulder 38 which abuts against a corresponding shoulder 39 in the cylinder and is held in position by turning inwardly an axially projecting part 40 of the cylinder. A seal 41 is interposed to prevent fluid leakage. The end member 36 could alternatively or additionally be secured to the cylinder in the same manner as the member 30 of FIG. 3.

Figure 5:
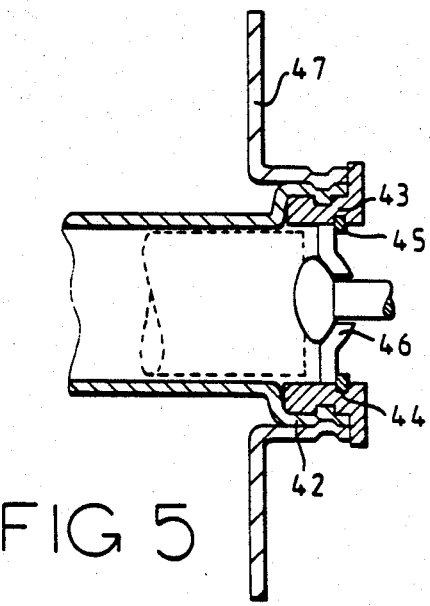
FIG. 5 is a view similar to FIG. 2 illustrating a further alternative form of the master cylinder of the invention.

The previously described embodiments cannot be readily dismantled and would, in service, be discarded when internal servicing or repair is required. The alternative embodiment of FIG. 5 is designed as a serviceable unit from which the internal components can be removed when required. For this purpose, the outer open end portion 42 of the cylinder is flared to permit the accommodation therein of an end member 43 of which the internal diameter is no smaller and preferably slightly greater than that of the cylinder. The end member has an internal groove 44 housing a circlip 45 which acts as a retainer for a rod backstop member 46. The end member 43 has an external diameter such as to fit closely within the flared end portion 42 of the cylinder and the securing in position of the end member and a flange member 47 is effected in the manner described in relation to the preceding embodiments.

It will be seen that, upon removal of the circlip 45 and member 46, the piston and other internal cylinder components may readily be withdrawn through the end member 43 for servicing or repair and subsequently replaced. An additional advantage of this embodiment is that retraction of the piston is not limited by the end of the member 43 and the piston can therefore be housed nearer to the actual extremity of the cylinder. Some foreshortening of the cylinder can result, as compared with the previous embodiments leading to a more compact assembly.

It will be seen that the method of the invention provides an extremely simple and effective means of securing an outwardly projecting flange to a pressure cylinder and is particularly advantageous in the production of fabricated master cylinders in which it is important to avoid fixing processes such as force-fitting and welding which are liable to cause deformation of the tube and thereby reduce the integrity of the piston to bore sealing.

The method also provides, in a very simple and convenient manner, a backstop for the force-input rod, or for a piston itself, when the piston and rod are in their retracted positions. In the method of the invention, inwardly directed forces applied during the securing of the or each end member and of the flange member are sustained by the end members themselves and have no significant effect upon the shape of the cylinder bore.

I claim:

1. A method of forming a pressure cylinder assembly which includes a cylinder and an outwardly projecting flange, comprises the steps of inserting into a tubular member a body having a depression in its outer surface such that said depression lies in opposition to the wall of the member, deforming said wall into the depression to lock the body at least axially within the member and to form a secondary depression in the outer surface of the member, placing a flanged collar around the member and deforming the collar into the secondary depression in such a manner as to lock the collar axially and rotationally relative to the body so that a flange of the collar may then serve to mount the assembly on a support.

2. A method according to claim 1 wherein a plurality of circumferentially spaced depression are formed in the body to provide both rotational and axial locking of the tubular member relative to the body.

3. A method according to claim 1 wherein a plurality of circumferentially spaced secondary depressions are formed in the tubular member and the collar is deformed into at least some of these secondary depressions.

4. A method according to claim 1 wherein the body is formed with an outwardly projecting flange against which the collar is brought into engagement prior to forming said secondary depressions, in order to set the position of the flange longitudinally of the body.

5. A method according to claim 1 further including the step of flaring an end portion of the tubular member to accommodate the body which has an internal diameter no smaller than the internal diameter of the tubular member, and the insertion of separate retaining means for retention of internal cylinder components.

6. A method according to claim 1 wherein an end member is inserted into the open end of the tubular member remote from the body, the end member having at least one depression lying in opposition to said wall of the tubular member, said wall being deformed into each depression to lock the end member at least axially within said tubular member.

7. A method according to claim 1 wherein an end member having a fluid pipe is inserted into the open end of the tubular member remote from the body, the end member being secured at least axially within the tubular member by deformation of the latter against a surface of the end member.

8. A pressure cylinder assembly wherein an end member and a flanged collar are secured to a tubular member by a method according to claim 1.

9. A pressure cylinder assembly according to claim 8 wherein an end member is secured within the end of the tubular member remote from the body and provides means for the connection of a fluid conduit to the assembly.

10. A pressure cylinder according to claim 8 wherein the body forms a backstop for one of piston or its actuating rod.

11. A pressure cylinder assembly according to claim 8 wherein an end portion of the cylinder is flared to accommodate the body which has an internal diameter no smaller than the internal diameter or the tubular member and separate retaining means is provided for retention of the internal cylinder components.

* * * * *